United States Patent [19]

Mundhenke

[11] Patent Number: 4,810,743

[45] Date of Patent: Mar. 7, 1989

[54] UV STABLE, IMPACT RESISTANT, FLAME RETARDED ABS COMPOSITION

[75] Inventor: Rudolph F. Mundhenke, North Tonawanda, N.Y.

[73] Assignee: Occidental Chemical Corporation, Niagara Falls, N.Y.

[21] Appl. No.: 151,213

[22] Filed: Feb. 1, 1988

[51] Int. Cl.$^4$ ............................................. C08K 5/02
[52] U.S. Cl. ................................. 524/411; 524/377; 524/380; 524/467
[58] Field of Search ............... 524/411, 412, 467, 265, 524/266, 269, 377, 380, 366; 525/70, 87

[56] References Cited

U.S. PATENT DOCUMENTS

| | | | |
|---|---|---|---|
| 2,720,495 | 11/1955 | Phreaner | 524/269 |
| 3,097,188 | 7/1963 | Ingram | 524/380 |
| 3,403,036 | 8/1968 | Hindersinn et al. | 524/467 |
| 3,796,677 | 3/1974 | Laber et al. | 525/87 |
| 4,169,869 | 10/1979 | Milenius | 525/87 |
| 4,203,931 | 5/1980 | Lee | 524/411 |
| 4,560,719 | 12/1985 | Nakamura et al. | 524/269 |
| 4,703,083 | 10/1987 | Giori et al. | 525/86 |

FOREIGN PATENT DOCUMENTS 58-89641  5/1983  Japan .

OTHER PUBLICATIONS

Tabor et al., "Decabromodiphenyl Oxide-A New Fire Retardant Additive for Plastics", Fire Retardants: Proceedings of 1974 Intl. Sumposium on Flammability and Fire Retardants (Technomic Pub. Co.) pp. 162–178.

Chang et al., "Dynamic . . . and Thermal Properties of Fire Retardant High Impact Polystyrene", J. Appld. Polymer Sci., vol. 21, 2167–2180 (1977).

*Primary Examiner*—Veronica P. Hoke

[57] ABSTRACT

UV stable, impact resistant, flame retarded ABS compositions are obtained by compounding ABS with nitrile rubber, surfactant, Diels-Alder adduct of 2 moles of chlorocyclopentadiene and 1 mole of cyclooctadiene (commonly known as Dech Plus) and antimony oxide. Such compositions consist essentially by weight of from about 1% to about 9% nitrile rubber, from about 0.3% to about 5% surfactant, from about 14% to about 30% Dech Plus, from about 4% to about 20% antimony oxide and from about 50% to about 80.9% ABS. The ABS constituent has an Izod Impact Strength of at least 1.5 foot-pounds per inch. The nitrile rubber is preferably acrylonitrile-butadiene copolymer containing by weight from about 15 to about 50% acrylonitrile component, and the surfactant is preferably siloxane-oxyalkylene copolymer. The compositions have Izod Impact Strengths ranging from 2.0 to 4 foot-pounds per inch and in most cases a V-O (UL94) flammability classification.

9 Claims, No Drawings

UV STABLE, IMPACT RESISTANT, FLAME RETARDED ABS COMPOSITION

TECHNICAL FIELD

This invention is directed to novel impact resistant, flame retarded ABS compositions which are especially useful for providing housings for electronic apparatus such as typewriter casings and business machine housings (e.g. computer housings).

BACKGROUND OF THE INVENTION

Flame retarded housings for electronic apparatus are normally considered a necessity by electronic apparatus manufacturers to protect against the risk of liability should a fire occur. To meet this need, housings have been fabricated from ABS compositions incorporating brominated fire retardancy additives such as octabromodiphenyl oxide, decabromodiphenyl oxide and bis(tribromophenoxy)ethane, usually in combination with antimony oxide. These brominated additives are not generally considered UV stable, and compositions containing UV unstable additives, when exposed to fluorescent light or other source of ultraviolet radiation, yellow to an undesirable degree. The conventional brominated additives also are disadvantageous in forming dioxin (which is considered to be hazardous) when they burn and in lowering the heat distortion temperature of ABS.

Diels-Alder adduct of 2 moles of chlorocyclopentadiene and 1 mole of cyclooctadiene, a commercially available flame retarder for use in polymers, has been added in small amounts to ABS in substitution for conventional brominated additives in Japan but the product obtained does not have the highest flammability rating and has poor impact strength.

It is an object herein to provide a UV stable, flame retarded ABS composition suitable for use for housings for electronic apparatus or other analogous use.

As used herein, the term "UV stable" means an increase in Yellowness Index of less than 10 between original and seven day readings in testing according to ASTM Procedure No. 1926.

As used herein, the term "impact resistant" means an Izod Impact Strength in foot-pounds per inch of notch as determined on ⅛ inch samples by ASTM Test D256, of at least 2.0

As used herein the term "flame retarded" means a flammability classification of V-1 or V-0 as determined in Underwriters Laboratories Inc. Test UL94 (third edition) on ⅛" samples.

SUMMARY OF THE INVENTION

It has been discovered herein that the above object is realized and additionally advantages are provided of no risk of dioxin formation, no blooming even at 80° C., and good elongation properties, by incorporating with ABS a quaternary additive of nitrile rubber, surfactant, Diels-Alder adduct of 2 moles of 70062 chlorocyclopentadiene and 1 mole of cyclooctadiene (hereinafter . sometimes referred to as "said Diels-Alder adduct"), and antimony oxide. Omitting either the nitrile rubber or the surfactant or both of these results in the Izod Impact Strength in foot-pounds per inch of notch determined by ASTM D-256 below 2.0 whereby there is unacceptable risk of breakage when articles fabricated of the composition are subjected to impact forces.

In particular, the compositions of the present invention are UV stable, impact resistant, flame retarded thermoplastic compositions which consist essentially by weight of (a) from about 1% to about 9% nitrile rubber, (b) from about 0.3% to about 5% surfactant, (c) from about 14% to about 30% of said Diels-Alder adduct, (d) from about 4% to about 20% antimony oxide and (e) from about 50% to about 80.7%. acrylonitrile-butadiene-styrene copolymer having an Izod Impact Strength in foot-pounds per inch of notch determined on ⅛ inch samples according to ASTM Test D-256, of at least 1.5.

DETAILED DESCRIPTION

The composition herein preferably consists essentially by weight of from about 2% to about 4% nitrile rubber, from about 0.5% to about 2% surfactant, from about 15% to about 20% of said Diels-Adler adduct, from about 5.5% to about 7% antimony oxide, and from about 67% to about 77% of said acrylonitrile-butadiene-styrene copolymer.

Turning now to the nitrile rubber ingredient, it preferably is acrylonitrile-butadiene copolymer having an acrylonitrile content, on a weight percentage basis based on the total weight of acrylonitrile and butadiene used to form the copolymer, ranging from about 15% to about 50%, and a butadiene content, on a weight percentage basis based on the total weight of acrylonitrile and butadiene used to form the copolymer, ranging from about 85% to about 80%. Very preferably, it is acrylonitrile-butadiene copolymer having an acrylonitrile content, on a weight percentage basis based on the total weight of acrylonitrile and butadiene used to form the copolymer, ranging from about 17% to about 35%, and a butadiene content, on a weight percentage basis based on the total weight of acrylonitrile and butadiene used to form the copolymer, of about 83% to about 65%. Such ingredient is readily formulated into the composition herein utilizing either a chunky form or a granular form. Suitable nitrile rubbers for use herein are readily available commercially. For example, a preferred nitrile rubber for use herein is sold as Polymer 053 by Scientific Polymer Products, Inc. of Ontario, N.Y.; it is available in slab or chunk form and has an acrylonitrile content of 19-22% on a weight basis and a Mooney viscosity (ML-4@212° F.) of 65-86 and a density of 0.98 and is soluble in methyl ethyl ketone. Another nitrile rubber for use herein is sold under the designation Chemigum P83 by Goodyear Chemical; it is sold in granular form and has an acrylonitrile content on a weight basis of 33%.

Turning now to the surfactant ingredient, it preferably is a nonionic surfactant and is, for example, selected from the group consisting of polysiloxanes, siloxane-oxyalkylene copolymers, acetylenic diols, and alkylene oxide adducts of acetylenic diols. Siloxane-oxyalkylene copolymers are very preferred.

Preferred polysiloxanes are polydimethylsiloxanes and have kinematic viscosities at 25° C. ranging, for example, from 0.65 mm²/s to 100000 m²/s. Such compounds are sold under the name Silicone Fluids AK by by Wacker-Chemie GmbH of Munich, Germany; these generally have surface tensions less than 22 mN/m at 25° C. indicating high surface activity. A very suitable product which is described by the manufacturer (Air Products & Chemicals, Inc. of Allentown, PA) as a polysiloxane is supplied under the designation XF-B41-57 and is described as having a boiling point at atmospheric pressure of greater than 300° F., a vapor pressure at 77° F. of less than 5 mm Hg, a solubility in water of less than 0.1% and a flash point (closed cup) of 127° F.

Siloxane-oxyalkylene copolymers useful as surfactant ingredient can have, for example, the general formula I:

$$R_aSiY_{4-a} \qquad \text{I}$$

wherein a is 0 or an integer from 1 to about 3, R is a alkyl group containing from 1 to about 30 carbon atoms, or a group of formula II:

$$R'(OR')_bOR'' \qquad \text{II}$$

wherein R' is alkylene group containing from 1 to about 6 carbon. atoms, b has a value of from 1 to about 100, preferably from 10 to 30; and R'' is a capping group which can be selected from hydrogen, alkyl, acyl, aryl, alkaryl, aralkyl or alkenyl groups containing up to about 20 carbon atoms, sulfate, sufonate, phosphate, carboxylate, phosponate, borate or isocyanate groups, or mixtures thereof; Y is a group having the formula III:

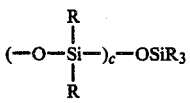

wherein R is as defined above and c has a value from 1 to about 200; and wherein at least one R group in the compound has the formula II. In said formula II, the same chain can contain the same or different oxyalkylene groups.

Other siloxane-oxyalkylene copolymers useful as surfactant ingredient include, for example, those with Si-O-C bonds, such as those having the general formula

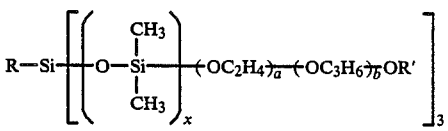

wherein x ranges from 1 to about 200, a plus b has a value of from 2 to about 100 and R and R' are lower alkyl, i.e., alkyl with from 1 to 3 carbon atoms.

Siloxane-oxyalkylene copolymers for use as surfactant ingredient herein are readily available commercially. A very preferred siloxane-oxyalkylene copolymer surfactant is available from General Electric Company and is designated SF 1188 Silicone Fluid; it is described by the manufacturer as being a copolymer of polydimethylsiloxane and polyoxyalkylene ether and as having a viscosity of 1000 cps at 25° C., a specific gravity at 25° C. at 1.04, a Flash Point (Pensky Martens) of 82° C. and a surface tension at 25° C. of 25.5 dynes/cm and as being water soluble below 43° C. and as exhibiting inverse water solubility above 43° C. Another very suitable siloxane-oxyalkylene copolymer surfactant is available from Union Carbide Corporation and is designated SILWET Surfactant L-722; it is described by the manufacturer as being polyalkyleneoxide modified polydimethylsiloxane, as having the above formula IV, as having a boiling point greater than 150° C., a freezing point less than −29° C., a specific gravity of 0.99, a bulk surface tension at 25° C. of 23.6 dynes/cm, a viscosity at 25° C. of 125 cSt and as being insoluble in water. Still other useful siloxane-oxyalkylene copolymer surfactants are available from Dow Corning Corporation under the designations Dow Corning 193 Surfactant and Dow Corning 190 Surfactant; these are described by the manufacturer as silicone glycol copolymers with a polydimethylsiloxane backbone with chains pendant to backbone silicon atoms in non-terminal positions which contain a mixture of oxyethylene and oxypropylene groups, and as being soluble in water, and having a surface tension of 72.8 dynes/cm in distilled water. Dow Corning 190 Surfactant is further described as having a specific gravity of 1.035, a viscosity at 25° C. of 1500 cs, a flash point (open cup) of 250° F. and an inverse solubility point (0.1% water solution) of 97° F. Dow Corning 193 Surfactant is further described as having a specific gravity of 1.07, a viscosity at 25° C. of 465 cs, a flash point (open cup) of 300° F., an inverse solubility point (0.1 percent water solution) of 73° C., and a hydroxyl number of 75.

Suitable acetylenic diol surfactant is 2,4,7,9-tetramethyl-5-decyn-4,7-diol and is available from Air Products and Chemicals, Inc. under the designation Surfynol 104 Surfactant. Surfynol 104 Surfactant is described as a white, waxy solid having a melting point of 45° C. and a water solubility of 0.1% at 25° C. Another acetyienic diol product is sold by Air Products and Chemicals, Inc. under the designation Surfynol DF-110; it is described by the manufacturer as a white waxy solid having a specific gravity of 0.863 at 65° C., a flash point of 230° F., a melting point of 56°–59° C., a boiling point of 191° C. @ 96 mm, a vapor pressure less than 10 mm at 25° C. and a water solubility of approximately 0.0 weight %.

Suitable surfactant ingredients which are alkylene oxide adducts of acetylenic diols are ethoxylated tetramethyldecyndiols (e.g. the reaction product of ethylene oxide and 2, 4,7,9-tetramethyl-5-decyn-4,7-diol). A very suitable product of this kind is 2,4,7,9-tetramethyl-5-decyn-4,7-diol ethoxylated to contain 65 mole percent oxyethylene content and is available from Air Products and Chemicals, Inc. under the designation Surfynol 465 and is described by the manufacturer as having a specific gravity at 25° C. of 1.038, a viscosity at 25° C. of 150–160 cps, an HLB of 13, a surface tension in 0.1% water solution of 37.0 (measured using a du Nouy Tensiometer) and as being soluble in water at concentrations greater than 1%.

We turn now to the said Diels-Alder adduct ingredient; it is also knoWn as 1,2,3,4,7,8,9,10,13,13,14,14-dodecachloro-1,4,4a,5,6,6a,7,10,10a,11,12,12a-dodecahydro-1,4:7,10-dimethanodibenzo(a,e)cyclooctene, and as 1,4,7,10-dimethanocycloocta-1,2,3,4,7,8,9,10,13,13,14,14-dodecachloro-1,4,4a,5,6-,6a,7,10, 10a,11,12,12a-dodecahydro[1,2,5,6]-dibenzene. Its preparation is disclosed by Ziegler et al, Annalen der Chemie, 1954, vol. 589, pp 157–162; Call No. QD1.L7. It has the structural formula

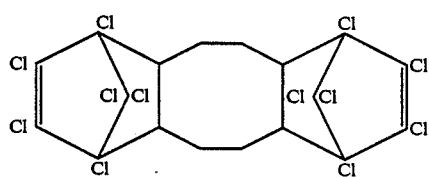

It has been assigned CAS Number 13560-89-9. It is described as a fire retardant for polymeric materials in Hindersinn et al U.S. Pat. No. 403,036. It is commonly known as Dech Plus, and it is available commercially from Occidental Chemical Corporation under the designation DECHLORANE PLUS. It is sold in powder form under the designation Dechlorane Plus 1000 and in granular for under the designation Dechlorane Plus 25. It is described by the manufacturer as having a melting point of 350° C. (with decomposition), a density of 1.8 g/cc, and a vapor pressure at 200° C. of 0.006 mm of Hg.

We turn now to the antimony oxide ingredient. It preferably is antimony trioxide which has the formula $Sb_2O_3$. Antimony trioxide is readily commercially available from M & T Chemicals Inc. of Rahway, N.J.

We turn now to the acrylonitrile-butadiene-styrene copolymer ingredient; this is commonly known as ABS or ABS plastic. Preferably, this ingredient has an Izod Impact Strength in foot-pounds per inch of notch determined on ⅛ inch samples by ASTM Test D-256 ranging from 4 to 12. This ingredient is readily prepared by polymerizing styrene and acrylonitrile in the presence of butadiene polymer(polybutadiene) using from about 10% to about 30% by weight acrylonitrile, from about 5% to about 60% by weight polybutadiene and from about 85% to about 10% by weight styrene, the weight percentages of acrylonitrile, polybutadiene and styrene being based on the total weight of acrylonitrile, polybutadiene and styrene; such polymerizing is readily carried out by known polymerization techniques including solution, bulk, emulsion and suspension polymerization techniques and the product formed while normally including both graft copolymer formed by graft polymerizing styrene and acrylonitrile onto polybutadiene and also copolymer of styrene and acrylonitrile, is designated acrylonitrile-butadiene-styrene copolymer or alternatively terpolymer of acrylonitrile, butadiene and styrene. The polybutadiene for use as described above is readily formed by polymerizing butadiene at a temperature below 60° C., for example, using bulk, solution or emulsion techniques. Suitable processes for preparing acrylonitrile-butadiene-styrene copolymer ingredient for use herein are described, for example, in Fremon et al U.S. Pat. No. 3,168,593 and Calvert U.S. Pat. No. 3,238,275 and Papetti U.S. Pat. No. 4,046,839. Acrylonitrile-butadiene-styrene copolymer ingredient for use herein is readily available commercially under the designation Cycolac L from Borg-Warner Corporation. Cycolac L is described by the manufacturer as having an Izod Impact Strength in foot-pounds per inch of notch (⅛" bar) as determined by ASTM Test D-256, method A, of 7.5 at 73° F., a tensile strength (Type 1, ⅛ inch thickness) at 73° F. of 5,000 psi as determined by the ASTM Test D-638 (0.2 inch/min), a tensile modulus (Type 1, ⅛" thickness) at 73° F. of $2.6 \text{ psi} \times 10^5$ as determined by ASTM Test D-638 (0.2 inch/minute), a flexural yield strength (⅛ inch×½ inch×4 inch bar) of 8500 psi at 73° F., of 4300 psi at 160° F. and at 12,100 psi at −40° F., as determined by ASTM Test D-790 (0.05 inch/minute), a flexural modulus (⅛ inch×½ inch×4 inch bar) of $2.7 \text{ psi} \times 10^5$ at 73° F., of $1.6 \text{ psi} \times 10^5$ at 160° F. and of $2.8 \text{ psi} \times 10^5$ at −40° F. as determined by ASTM Test D-790 (0.05 inch/minute), and a Rockwell R hardness of 90 at 73° F., as determined by ASTM D-785, all the samples tested being injection molded specimens. Compression-molded specimens of Cycolac L were described by the manufacturer as having a coefficient of thermal expansion of 6.1 in/in/° F. ($\times 10^5$) as determined by ASTM Test D-696, a deflection temperature (on a ½ inch×½ inch×5 inch unannealed bar) at 264 psi of 188° F. at 10 mils deflection and at 66 psi of 208° F. at 10 mils deflection as determined by ASTM Test D-648 and a deflection temperature (on a ½ inch×½ inch×5 inch annealed bar) at 264 psi of 210° F. at 10 mils deflection and at 66 psi of 219° F. at 10 mils deflection as determined by ASTM Test D-648. Cycolac L is further described by the manufacturer as having a specific gravity of 1.02 for injection molded specimens (as determined by ASTM Test D-792 Method A) and a flammability for compression-molded specimens of 1.4 in/min as determined by ASTM Test D-635. A very preferred acrylonitrile-butadienestyrene copolymer ingredient is sold by Borg-Warner Corporation under the designation Cycolac L 1000; it has been measured to have an Izod Impact Strength of 9.6–10.2 foot-pounds per inch of notch (⅛" bar) as determined by ASTM Test D-256.

The compositions of the present invention are readily formulated by compounding preferably using a temperature of 190° C. to 270° C. While the term melt blending can be used to describe the formulating, it is should be noted that neither the Dech Plus nor the antimony oxide are melted at the temperatures preferably utilized. The compounding is readily carried out utilizing a Farrel Mill for small batches and an extruder for large batches. The ingredients may be premixed for feeding to the compounding apparatus or may be fed thereto in succession. In a preferred commercial method, the ABS is melted in an extruder and the other ingredients are fed into the extruder downstream into the melted ABS.

The compositions herein can optionally contain compatible colorants, pigments, dyes, processing aids (e.g. lubricants to aid in extruding) and thermostabilizers, in conventional amounts.

The compositions herein are UV stable in that they normally exhibit an increase in Yellowness Index between initial and seven day readings determined in accordance with ASTM Procedure No. 1925 of less than 7.6, are impact resistant normally having an Izod Impact Strength in foot-pounds per inch of notch as determined on a ⅛ inch bar by ASTM D-266 of 2.0 to 4, and have a flammability classification at least as high as V-1 and in most cases of V-0 (as determined by Underwriters Laboratories Inc. Test UL94 (3rd edition) on ⅛ inch thick specimens.

The invention is illustrated in the specific examples which are each designated "EXAMPLE" hereinafter, and comparison of compositions which depart from the invention is illustrated in the specific examples which are designated hereinafter as "REFERENCE EXAMPLE". In the Examples and Reference Examples, except where otherwise stated, 1000 gram batches were prepared utilizing a Farrel Mill (with rolls heated to 200° C.) and the ABS ingredient was introduced onto the mill first and melted in 2 to 3 minutes whereupon the nitrile rubber ingredient, if any, was added with melting in 2 to 3 more minutes, whereupon surfactant ingredient, if any, was added over 2 to 3 minutes whereupon an admixture of Dech Plus and antimony trioxide (ordinarily admixed by shaking together in a cup), if any, was added, and treatment with the mill was continued until a homogeneous formulation was obtained.

In the Examples and Reference Examples, Izod Impact Strengths were determined on ⅛ inch bars in foot-pounds per inch of notch by ASTM Test D-256, tensiles were determined by ASTM Test D-638, elongations were determined by ASTM Test D-638, deflection temperatures were determined by ASTM Test D-648 (264 psi), flammability classification was determined in accordance with UL94, third edition, of Underwriters Laboratories Inc. on ⅛ inch samples, and Yellowness Index was determined in accordance with ASTM Procedure No. 1925.

The tradenames used below have been explained above and the compositions represented by such have been described above insofar as information is available.

We turn now to the specific Examples and Reference Examples.

EXAMPLE I

A composition was formulated containing by weight 73% Cycolac L 1000, 3% acrylonitrile-butadiene copolymer (Polymer 053 obtained from Scientific Polymer Products, Inc.), 1% SF 1188 Silicone Fluid surfactant, 16.9% Dechlorane Plus 1000, and 6.1% antimony trioxide. It was determined to have an Izod Impact Strength of 3.05 foot-pounds per inch, a tensile at yield of 4616 psi, a tensile at break of 3868 psi, an elongation at yield of 2.9%, an elongation at break of 20.6, a deflection temperature of 82° C. and a flammability classification of V-0.

EXAMPLE II

A composition was formulated as in Example I except that it contained 1% SILWET L-722 surfactant in place of the 1% SF 1188 Silicone Fluid surfactant. It was determined to have an Izod Impact Strength of 3.07 foot-pounds per inch, a tensile at yield of 4672 psi, a tensile at break of 3662 psi, an elongation at yield of 2.9%, an elongation at break of 15.2, a deflection temperature of 83° C. and a flammability classification of V-0.

EXAMPLE III

A composition was formulated as in Example I except that it contained 1% Dow Corning 193 SURFACTANT in place of the 1% SF 1188 Silicone Fluid surfactant. It was determined to have an Izod Impact Strength of 2.84 foot-pounds per inch, a tensile yield of 4746 psi, a tensile at break of 3580 psi, an e longation at yield of 3.0%, an elongation break at 15.0%, a deflection temperature of 80° C., and a flammability classification of V-0.

EXAMPLE IV

A composition was formulated as in Example I except that it contained 1% Dow Corning 190 SURFACTANT in place of the 1% SF 1188 Silicone Fluid surfactant. It was determined to have an Izod Impact Strength of 3.01, a tensile at yield of 4584 psi, a tensile at break of 3706 psi, an elongation at yield of 2.9%, an elongation at break of 18.8%, a deflection temperature of 80° C. and a flammability classification of V-1.

EXAMPLE V

A composition was formulated as in Example I except that it contained 1% Surfynol DF-110 surfactant in place of the 1% SF 1188 Silicone Fluid surfactant. It was determined to have an Izod Impact Strength of 2.74 foot-pounds per inch, a tensile at yield of 5078 psi, a tensile at break of 4002 psi, an elongation at yield of 3.2%, an elongation at break of 10.7%, a deflection temperature of 83° C., and a flammability classification of V-0.

EXAMPLE VI

A composition was formulated as in Example I except that it contained 1% Surfynol 465 surfactant in place of the 1% SF 1188 Silicone Fluid surfactant. It was determined to have an Izod Impact Strength of 2.76, a tensile yield of 4830 psi, a tensile at break of 3556 psi, an elongation at yield of 3.0%, an elongation at break of 13.0%, a deflection temperature of 81° C., and a flammability classification of V-0.

EXAMPLE VII

A composition was formulated as in Example I except that it contained 1% XF-B41-57 surfactant in place of the 1% SF 1188 Silicone Fluid surfactant. It was determined to have an Izod Impact Strength of 2.9 foot-pound per inch, a tensile at yield of 4632 psi, a tensile at break of 3812 psi, an elongation at yield of 3.0%, an elongation at break of 14.6%, a deflection temperature of 79° C., a flammability classification of V-0, a Yellowness Index originally of 27.6, and a Yellowness Index at 7 days of 32.6.

REFERENCE EXAMPLE 1

Two compositions were formulated as in Example I except that they contained 77% by weight Cycolac L1000 and no nitrile rubber component and no surfactant component.

In one case the Izod Impact Strength was determined to be 1.5 foot-pounds per inch. In a second case the Izod Impact Strength was determined to be 1.46 foot-pounds per inch.

EXAMPLE VIII

A composition was formulated in Example I except that it contained by weight 72.6% Cycolac L 1000 and except that it contained by weight 3.4% Chemigum P83 in place of the 3% Polymer 053 and 1% by weight XF-B41-57 surfactant in place of the 1% SF 1188 Silicone Fluid surfactant. It was determined to have an Izod Impact Strength at 2.95 foot-pounds per inch, a tensile at yield of 4668 psi, a tensile at break of 3885 psi, an elongation at yield of 2.9%, and elongation at break of 14.5%, a deflection temperature of 82° C. and a flammability classification of V-0.

EXAMPLE IX

A composition was formulated as in Example VII except that it contained Dechlorane Plus 25 in place of Dechlorane Plus 1000. It was determined to have an Izod Impact Strength of 2.1 foot-pounds per inch, a tensile yield of 4490 psi, a tensile at break of 816 psi, an elongation at yield of 3.1%, an elongation at break of 16.4%, a deflection temperature of 79° C., a flammability classification of V-1, a Yellowness Index originally of 25.8, and a Yellowness Index at 7 days of 31.1.

REFERENCE EXAMPLE 2

A composition was formulated as in Example IX except that it contained 77% by weight Cycolac L 1000 and no nitrile rubber or surfactant. It ws determined to have an Izod Impact Strength of 0.6 foot-pounds per inch.

REFERENCE EXAMPLE 3

A composition was formulated as in Example IX except that it contained 76% by weight Cycolac L 1000 and no nitrile rubber. It was determined to have an Izod Impact Strength of 1.6.

REFERENCE EXAMPLE 4

A composition was formulated as in Example IX except that it contained 75.9% by weight Cycolac L 1000 instead of 73% by weight, 17% by weight Dechlorane Plus 25 instead of 16.9% and no nitrile rubber. It was determined to have an Izod Impact Strength of 1.4.

REFERENCE EXAMPLE 5

A formulation was made up as in Example I except that it contained 74% by weight Cycolac L 1000 instead of 73% and the surfactant was omitted and compounding was carried out in an extruder. Izod Impact Strengths were determined to be less than 2.0% foot-pounds per inch.

REFERENCE EXAMPLE 6

A formulation was made up as in Reference Example 5 except that Chemigum P83 was used in place of Polymer 053. Izod Impact Strengths were determined to be less than 2.0 foot-pounds per inch.

REFERENCE EXAMPLE 7

Izod Impact Strength testing on Cycolac L 1000 gave values in foot-pounds per inch of 10.2, of 10.0, and of 9.6

EXAMPLE X

A composition was formulated containing by weight 72.6% Cycolac L1000, 3,4% P715-Cl (a nitrile rubber with 27% acrylonitrile content available from Goodyear Chemicals), 1% XF-B41-57 surfactant, 16.9% Dechlorane Plus 1000, and 6.1% antimony oxide. It was determined to have an Izod Impact Strength of 3.5 foot-pounds per inch and a flammability classification of V-0.

Variations will be evident to those skilled in the art. Therefore, the scope of the invention is intended to be defined by the claims.

What is claimed is:

1. A UV stable, flame retarded thermoplastic composition having an Izod Impact Strength in foot-pounds per inch of notch determined by ASTM D-256 of at least 2.1, said composition consisting essentially by weight of (a) from about 1% to about 9% nitrile rubber, (b) from about 0.3% to about 5% surfactant, (c) from about 14% to about 30% Diels-Alder adduct of 2 moles of chlorocyclopentadiene and 1 mole of cyclooctadiene, (d) from about 4% to about 20% antimony oxide, and (e) from about 50% to about 80.7% acrylonitrile-butadienestyrene copolymer having an Izod Impact Strength in foot-pounds per inch of notch determined by ASTM D-256 of at least 1.5.

2. A composition as recited in claim 1 consisting essentially by weight of from about 2% to about 4% nitrile rubber, from about 0.5% to about 2% surfactant, from about 15% to about 20% Diels-Alder adduct of 2 moles of chlorocyclopentadiene and 1 mole of cyclooctadiene, from about 5.5% to about 7% antimony oxide, and from about 67% to about 77% of said acrylonitrile-butadiene-styrene copolymer.

3. A composition as recited in claim 2 wherein the nitrile rubber is acrylonitrile-butadiene copolymer having an acrylonitrile content on a weight percentage basis ranging from about 15% to about 50%.

4. A composition as recited in claim 8 wherein the nitrile rubber is acrylonitrile-butadiene copolymer having an acrylonitrile content on a weight percentage basis, ranging from about 17% to about 35%.

5. A composition as recited in claim 4 wherein the acrylonitrile-butadiene-styrene copolymer has an Izod Impact Strength of foot-pounds per inch of notch determined by ASTM D-256 ranging from 4 to 12.

6. A composition as recited in claim 5 wherein the acrylonitrile-butadiene-styrene copolymer is prepared by polymerizing styrene and acrylonitrile in the presence of polybutadiene using from 10% to about 30% by weight acrylonitrile, from about 5% to about 60% by weight polybutadiene and from about 85% to about 10% by weight styrene, the weight percentages of acrylonitrile, polybutadiene and styrene being based on the total weight of acrylonitrile, polybutadiene and styrene.

7. A composition as recited in claim 5 wherein the surfactant is a nonionic surfactant.

8. A composition as recited in claim 7 wherein the surfactant is selected from the group consisting of polysiloxanes, solixane-oxyalkylene copolymers, acetylenic diols and alkylene oxide adducts of acetylenic diols.

9. A composition as recited in claim 8 wherein the surfactant is selected from the group consisting of siloxaneoxyalkylene copolymers.

* * * * *

UNITED STATES PATENT AND TRADEMARK OFFICE
CERTIFICATE OF CORRECTION

PATENT NO. : 4,810,743

DATED : March 7, 1989

INVENTOR(S) : RUDOLPH F. MUNDHENKE

It is certified that error appears in the above-identified patent and that said Letters Patent is hereby corrected as shown below:

The following should be additionally listed on the cover page under "FOREIGN PATENT DOCUMENTS":
--1,078,088  5/80  Canada--.

The following should be additionally listed on the cover page under "OTHER PUBLICATIONS"
--Hensley, Modern Plastics Encyclopedia 1985-1986, pp. 6-7--; Plastics Compounding, September October 1980, 79-81, 86-89--; Plastics Compounding, March April 1986, 40, 42-46--; --Research Disclosure, 1982, 216, 124 # 21638, "Rubber Modified ABS Resins" (also C.A. 97: 7210e)--.

Claim 1 (column 10, line 7), "butadienestyrene" should be --butadiene-styrene--.

Claim 4 (column 10, line 22), "claim 8" should be --claim 3--.

Claim 9 (column 10, line 48), "aneoxyalkylene" should be --ane-oxyalkylene--.

Signed and Sealed this

Twenty-sixth Day of September, 1989

*Attest:*

DONALD J. QUIGG

*Attesting Officer*    Commissioner of Patents and Trademarks